United States Patent [19]

Broussard

[11] Patent Number: 4,848,980
[45] Date of Patent: Jul. 18, 1989

[54] DUST COLLECTOR ADAPTOR FOR ELECTRIC DRILLS

[76] Inventor: Alphe Broussard, 64, Avenue Mohamed Diouri, Kenitra, Morocco

[21] Appl. No.: 178,024

[22] Filed: Apr. 5, 1988

Related U.S. Application Data

[63] Continuation-in-part of Ser. No. 938,429, Dec. 5, 1986.

[51] Int. Cl.⁴ .............................................. B23B 47/00
[52] U.S. Cl. ................................... 408/67; 408/72 R
[58] Field of Search .................. 175/209, 211; 408/67, 408/72 R, 241 R, 241 G

[56] References Cited

U.S. PATENT DOCUMENTS 3,583,821 6/1971 Shaub .................................... 408/72
4,515,504 5/1985 Moore, Jr. ......................... 408/72 R

FOREIGN PATENT DOCUMENTS 2160331 6/1973 Fed. Rep. of Germany ........ 408/67
2160831 6/1973 Fed. Rep. of Germany .
2356565 5/1975 Fed. Rep. of Germany ........ 408/67
2404504 8/1975 Fed. Rep. of Germany .
2604348 8/1977 Fed. Rep. of Germany ... 408/241 R
3140776 4/1983 Fed. Rep. of Germany ........ 408/67
2441455 7/1980 France ................................. 408/67
2067106 7/1981 United Kingdom .

*Primary Examiner*—Gil Weidenfeld
*Assistant Examiner*—Daniel W. Howell
*Attorney, Agent, or Firm*—Fisher, Christen & Sabol

[57] ABSTRACT

A corrugated rubber device encompassing a relatively rigid and yet expandable larger end to provide a snug fit on the drilling end of electric drills. This corrugated rubber device has recoil capabilities to accommodate the penetration of the drill bit as it progressively sinks to the depth required. This body has a transparent end to facilitate the observation of the accurate start of the drill bit, the transparent end is a holding area to accumulate dust and debris. It has a rubber tip to protect the paint or other surface being drilled.

8 Claims, 4 Drawing Sheets

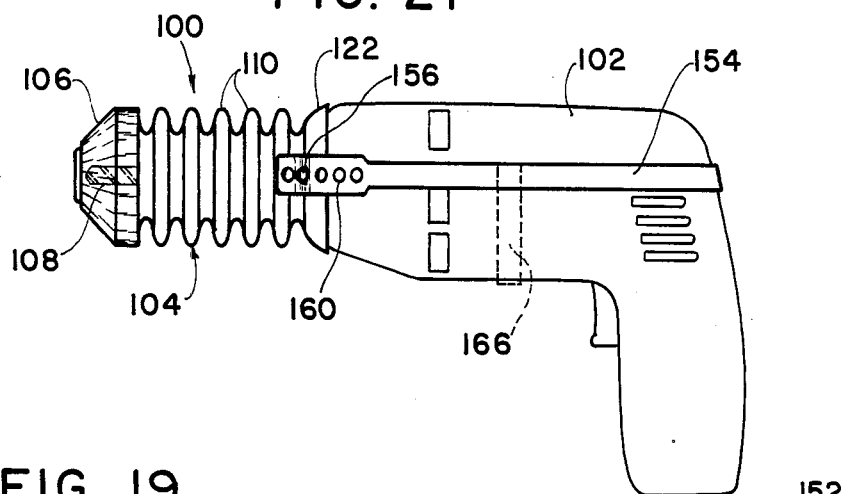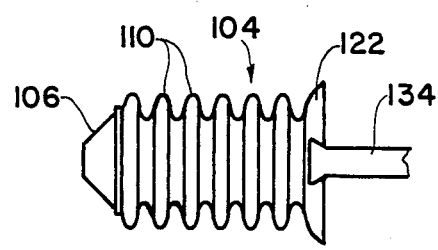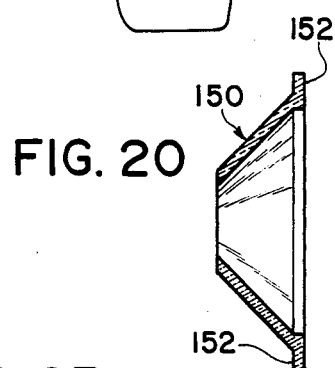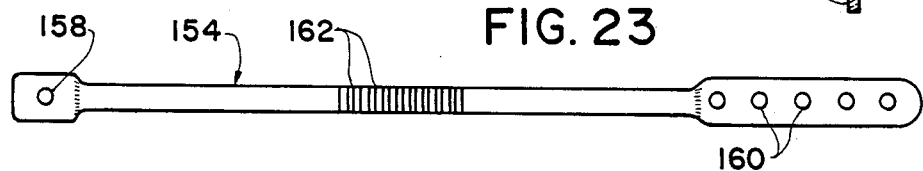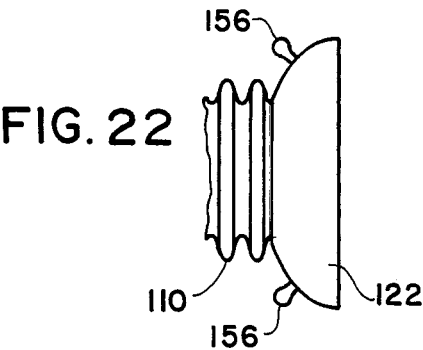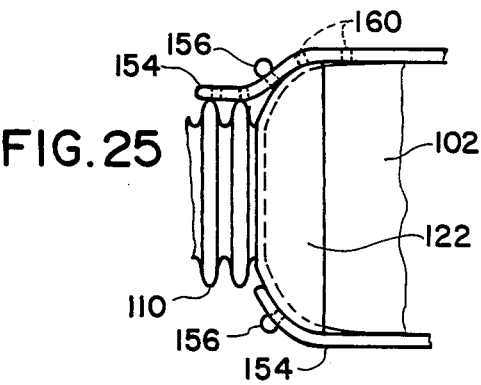

DUST COLLECTOR ADAPTOR FOR ELECTRIC DRILLS

This is a continuation-in-part of application Ser. No. 938,429, filed on Dec. 5, 1986.

FIELD OF THE INVENTION

The invention relates to collecting dust and debris, thereby, protecting the lungs, the eyes and the face while also avoiding the soiling of furnishings when drilling holes in bricks, concrete, wood and the like when performing repairs or alterations to homes, office, etc.

BROAD DESCRIPTION OF THE INVENTION

An object of the invention is to protect the lungs, the eyes and the face from dust when drilling holes. Another object of the invention is to avoid the soiling of furnishings in the area where drilling of holes is performed.

The obvious result of the invention device is that the lungs, the eyes and the face are protected from dust, and the removal of furnishings or cleaning after the drilling of holes is not necessary, since dust and debris is simultaneously collected by the invention device.

The invention involves a corrugated rubber device adaptable to the drilling end of electric drills. The invention device has a relatively rigid and yet expandable mouth-like larger end which has attachment means to provide a snug and stable fit around the various types of electric drills. The attachment means can be, for example, magnetized metal inserts or rubber suction cups. Also the attachment means can be, for example, straps attached to the larger end of the device which allow the device to be fitted on and held onto the front end of the drill. Such straps are preferably composed of an elastic, resilient material such as rubber. The body of the invention device has recoil capabilities to accommodate the penetration of the drill bit as it progressively sinks to the depth required. Preferably the end of the invention device is transparent to allow the user to observe the accurate start of the drill bit at the place previously marked for drilling. This transparent end has a rubber tip (preferably a rubber gasket around the hole in the transparent end through which the drill bit fits) to protect the paint, to ensure the collection of all dust and to help stabilize the drill bit on the marking. The transparent end is a removable holding area to accumulate the dust and debris generated when drilling holes.

BRIEF DESCRIPTION OF THE DRAWINGS

In the drawings:

FIG. 19 is a partial top elevational view of the invention device of FIG. 14 with another embodiment of the end portion of the invention device;

FIG. 20 is a side cross-sectional view of the embodiment of the end portion of the invention device of FIG. 14;

FIG. 21 is a side elevational view of the invention device mounted on an electric drill using another embodiment of the strap attachment means;

FIG. 22 is a partial top elevational view of the bottom portion of the embodiment of FIG. 21;

FIG. 23 is a top elevational view of the strap of the strap adjustment means of FIG. 21;

FIG. 24 is a side elevational view of the strap of FIG. 23; and

FIG. 25 is a partial top elevational view of the invention device of FIG. 21 on an electric drill.

DETAILED DESCRIPTION OF THE INVENTION

Figure 1:
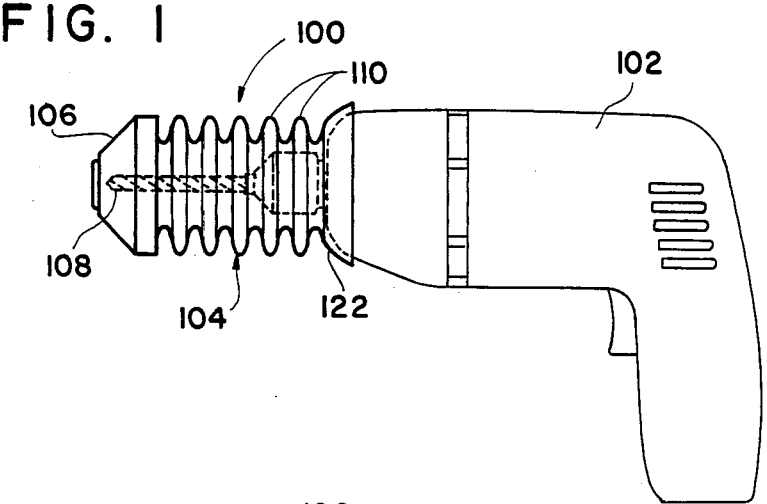
FIG. 1 is a side elevational view of the invention device mounted on an electric drill.
Figure 2:
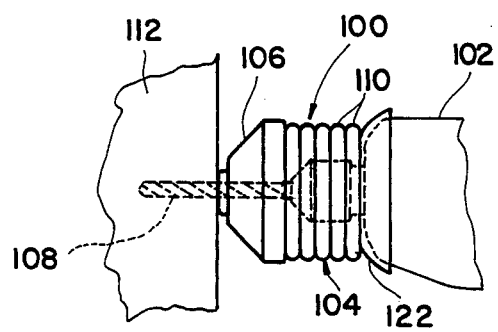
FIG. 2 is a partial side elevation of the invention device of FIG. 1 during the drilling phase.

In FIG. 1, adaptor 100 is shown mounted on the front end of electric drill 102. Adaptor 100 has body 104 and end portion 106. End portion 106 is preferably transparent as shown in FIG. 1 so that drill bit 108 can be seen and the tip of drill bit 108 placed where the user wants to drill a hole. Body 104 is collapsible, preferably having a series of rubber bellow-like folds of units 110. See FIG. 1. When electric drill 102 is pushed against a surface (112) to be drilled, folds 110 collapse upon each other as shown in FIG. 2. When pressure is released upon body 104, with drill bit 108 being pulled out of the drilled hole, resilient folds 110 of body 104 expand to their original shape whereby drill bit 108 resumes its position back in end portion 106. The dust and debris from the drilling operation are collected during the drilling operation within end portion 106.

Figure 3:
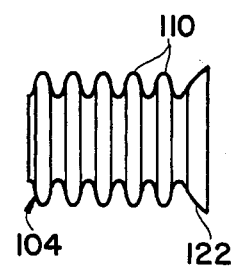
FIG. 3 is a side elevational view of the adaptor body of the invention device of FIG. 1.

Fold 110 of body 104 are best shown in FIG. 3. Body 104 is hollow, having passageway 114 (see FIG. 6).

Figure 4:
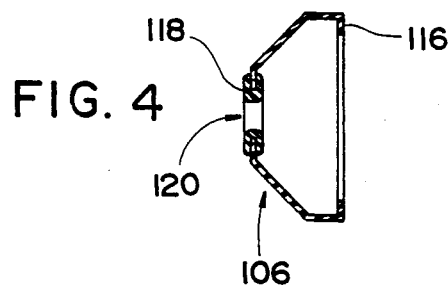
FIG. 4 is a side cross-sectional view of one embodiment of the end portion of the invention device of FIG. 1.
Figure 5:
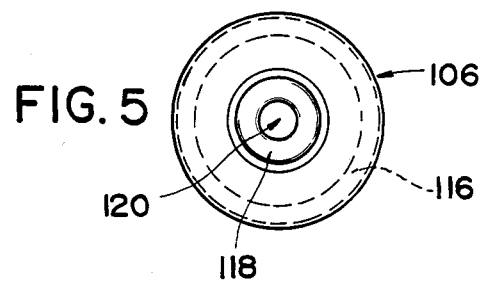
FIG. 5 is a top elevational view of the end portion of FIG. 4.

End portion 106 is shown in cross-section in FIG. 4. The lower end of end portion 106 is open. Lip 116 fits over front fold 110 of body 104. Since front fold 110 is made of rubber or other pliable, resilient material, it can easily be fitted into the lower end of end portion 106 (as shown in FIG. 1) and held in place by lip 116 of end portion 106. This is the preferred attachment means. To empty the collected dust and debris from a drilling operation, end portion 106 is removed and the dust and debris is dumped out of end portion 106 and hollow body 104. Rubber gasket 118 fits around the edge of hole 120 in the top of end portion 106. Drill bit 108 passes through hole 120 during the drilling operation. As shown in FIG. 2, the preferred use of rubber gasket 118 protects the surface (112) to be drilled.

Figure 6:
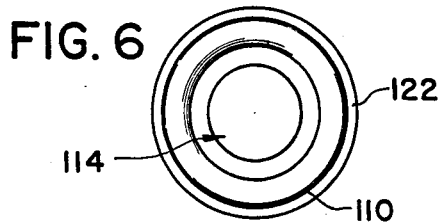
FIG. 6 is a top elevational view of the adaptor body of the invention device of FIG. 1.
Figure 7:
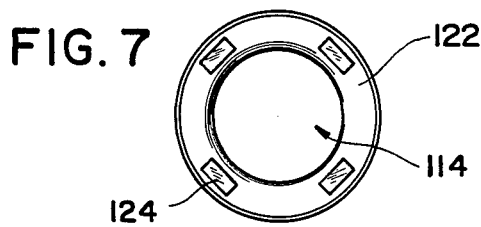
FIG. 7 is a bottom view of one embodiment of the adaptor body of the invention device of FIG. 1.
Figure 8:
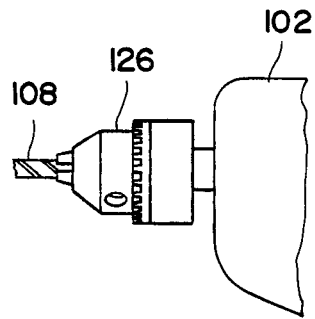
FIG. 8 is a partial elevational view of the front end of one type of electric drill.
Figure 13:
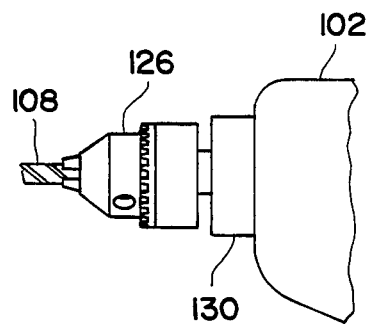
FIG. 13 is a partial elevational view of the front end of another type of electric drill.
Figure 9:
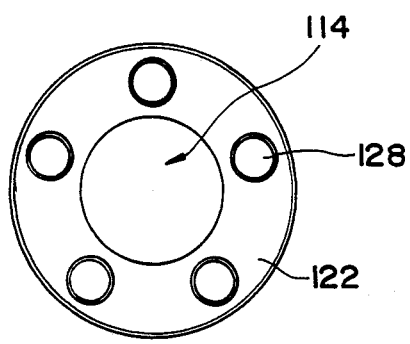
FIG. 9 is a bottom view of another embodiment of the adaptor body of the invention device of FIG. 1.
Figure 10:
FIG. 10 is a side elevational view of the suction cups used in the embodiment of FIG. 9.
Figure 11:
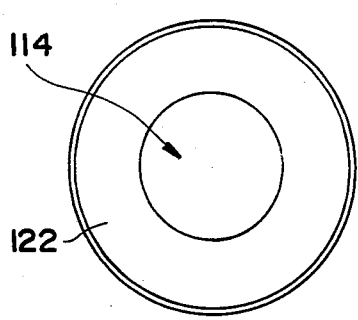
FIG. 11 is a bottom elevational view of another embodiment of the adaptor body of the invention device of FIG. 1.
Figure 12:
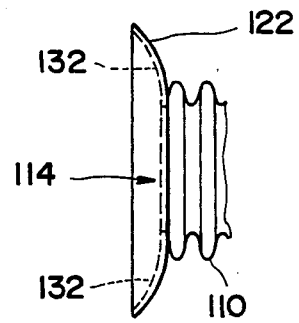
FIG. 12 is a partial side elevational view of the bottom portion of the embodiment of FIG. 11.

Adaptor body 104 has bottom rim 122, which extends down and out from the bottom of body 104 to fit snugly on the front end of electric drill 102 (as shown in FIG. 1). FIG. 6 shows a top view of adaptor body 104. Magnets 124 (as shown in FIG. 7) mounted on the inside of bottom rim 122 can be used to secure bottom rim 122 against the front end of electric drill 102. This version of adaptor 100 is best used with an electric drill 102 of the type shown in FIG. 8, where bit 126 is located very close to the front end of electric drill 102. Preferably, suction cups 128 (see FIGS. 9 and 10) mounted on the inside of bottom rim 122 can be used to secure bottom rim 122 against the front end of electric drill 102. This preferred version is best used with the electric drill 102 of the type shown in FIG. 8. When electric drill 102 has extension portion 130 (as shown in FIG. 13), preferably the version of adaptor body 104 shown in FIGS. 11 and 12 is used. In such version, hole 114 of body 104 is constructed at its lower end of rim 132 so as to snugly fit over extension portion 130 to hold adaptor 100 in place against and on electric drill 102.

Figure 14:
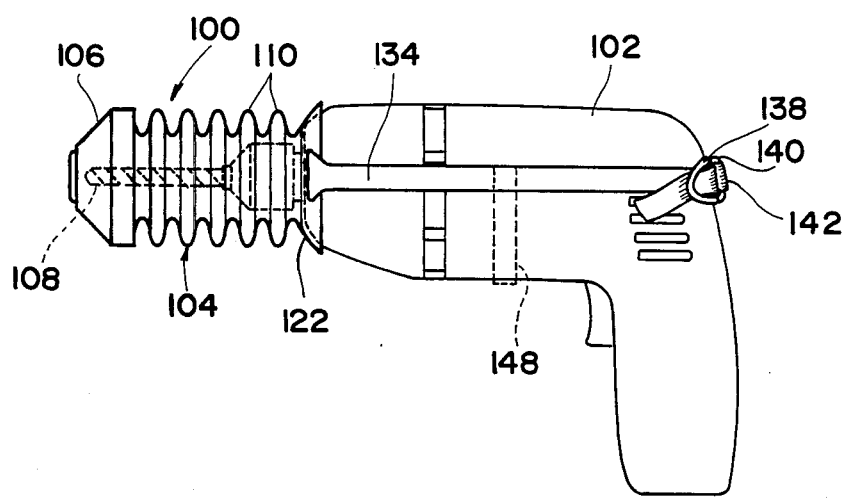
FIG. 14 is a side elevational view of the invention device mounted on an electric drill using one embodiment of the strap attachment means.
Figure 15:
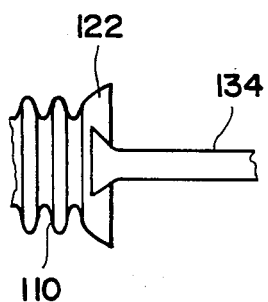
FIG. 15 is a partial side elevational view of the strap attachment means of FIG. 14 affixed to adaptor body of the invention device.
Figure 18:
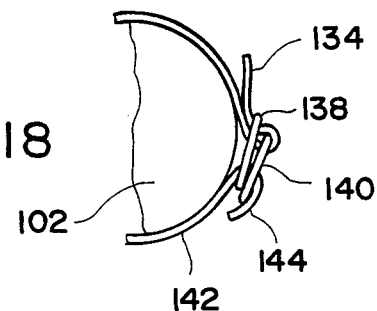
FIG. 18 is a partial top elevational view of the straps and adjustment unit of FIG. 14.
Figure 16:
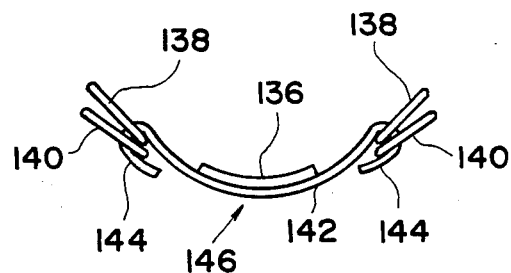
FIG. 16 is a top elevational view of the adjustment unit of the strap attachment means of FIG. 14.
Figure 17:
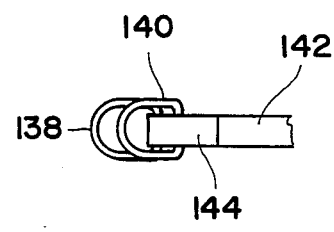
FIG. 17 is a partial back elevational view of the adjustment unit of FIG. 16.

In FIG. 14, adaptor 100 is shown mounted on the front end of electric drill 102 by means of adjustable straps 134. As many electric drills have plastic bodies, this embodiment provides an adaptor (100) which can be used with electric drills regardless of the type of material composing its casing. Strap 134 is preferably composed of rubber. As shown in FIG. 15, the end portion of strap 134 can be affixed to bottom rim 122 by fusing (preferred), gluing or any other effective means. Adjustment unit 146 includes curved strip 142 (preferably metal) which has U-shaped end segments 144 to hold rings 138 and 140 in a loose, swinging manner so that the loose ends of straps 134 can be cinched therethrough. See FIGS. 16 to 18. The cinching allows straps 134 to be tightened against drill 102. Optionally, a strip 136 of slip-resistant material such as rubber can be mounted on the inside arc of strip 142 to help hold strip 142 in relative position on the back side of drill 102. Also, optionally, strap 148 (shown in dotted lines in FIG. 14), which is attached on its ends to straps 134 and extends under drill 102, helps hold straps 134 in place.

End portion 150 of adaptor 100 is shown in FIGS. 19 and 20. Lip 152 of end portion 150 fits within end fold 110 of body 104. End portion 150 is preferably transparent.

In FIG. 21, adaptor 100 is shown mounted on the front end of electric drill 102 by means of adjustable strap 154. Strap 154 is composed of an elastic, resilient material, preferably rubber. Two diametrically-opposed pins 156 are located on the outer surface of bottom rim 122 of body 104. Pins 156 have knob-shaped ends as shown in FIG. 22. Strap 154 has one hole 158 in one end and a series of holes 160 on the other end—see FIGS. 23 and 24. Adjustment of strap 154 around drill 102 is achieved by selecting the appropriate hole 160 to fit over pin 156. See FIGS. 21 and 25. Optionally, a slip-resistant region is present on the surface of strap 154 adjacent to the back side of drill 162. As in FIG. 23, the slip-resistant region can be a series of grooves (162) with any arrangement; or, as in FIG. 24, the slip-resistant region can be a series of small protrusions (164). Optionally, strap 166 (shown in dotted lines in FIG. 21), which is attached on its ends to strap 154 and extends under drill 102, helps hold strap 154 in place.

What is claimed is:

1. A corrugated rubber device used as an adaptor to electric drills, comprising:
    (a) resilient, pliant adaptor body having a rigid and yet expandable mouth-like larger end, which has attachment means comprising at least one strap which is affixed to the larger end of the adaptor body and fits around the drill, to provide a snug and stable fit around the drill-holding end of the various types of electric drills;
    (b) the adaptor body having a transparent end, with a hole therein, to observe the accurate start of the drill bit at the place previously marked for drilling;
    (c) a rubber tip fitting in the hole in the transparent end of the adaptor body to protect the paint or other surface being drilled, to ensure the collection of all dust and to help stabilize the drill bit at the place previously marked for drilling, the rubber tip having a hole therein through which the drill bit passes when the drill bit end of the drill is pressed against an external surface, the hole in the rubber tip being only slightly wider than the drill bit;
    (d) the transparent end being a holding area to accumulate the dust and debris generated when drilling holes; and
    (e) the adaptor corrugated rubber device having recoil capabilities to accommodate the penetration of the drill bit as it progressively sinks to the depth required.

2. The device of claim 1 wherein the at least one strap has means for adjusting said that at least one strap.

3. The device of claim 1 wherein the at least one strap is composed of an elastic, resilient material.

4. The device of claim 1 wherein the rubber tip is a rubber gasket.

5. The device of claim 1 wherein the corrugated portion of the adaptor body is a series of bellow-like folds.

6. The device of claim 1 wherein the adaptor body is a rubber adaptor body.

7. The device of claim 1 wherein the transparent end is inwardly slanted.

8. The device of claim 1, further including an electric drill, the resilient, pliant adaptor body of said device mounting on the drill-holding end of the electric drill.

* * * * *